United States Patent
O'Hare

[15] 3,679,007
[45] July 25, 1972

[54] SHOCK PLASMA EARTH DRILL

[72] Inventor: Louis Richard O'Hare, 2700 Indiana N.E., Albuquerque, N. Mex. 87110

[22] Filed: May 25, 1970

[21] Appl. No.: 40,339

[52] U.S. Cl. ............................................................175/16
[51] Int. Cl. ..........................................................E21b 7/00
[58] Field of Search ....................175/16, 2, 11, 19; 166/299

[56] References Cited

UNITED STATES PATENTS

| 3,158,207 | 11/1964 | Rowley | 175/16 |
| 2,953,353 | 9/1960 | Allen | 175/16 |
| 3,500,942 | 3/1970 | Smith | 175/16 |

OTHER PUBLICATIONS

William C. Maurer– Novel Mechanical Drills Show Promise Mar. 11, 1968 The Oil and Gas Jornal pp. 91–98
Drilling– A. J. Steiger– Russian Electric Arc Drill Nears Oil Field Test Stage March, 1958 pp. 106–107

*Primary Examiner*—Robert L. Wolfe

[57] ABSTRACT

The repeated discharge of a high voltage large capacitance condenser bank across the gap of a physically strong, specially designed, water immersed electrode produces an explosive shock wave moving downward and outward to produce a hole into which the electrode and connected piping can repeatedly fall producing a deep hole in earth or rock. The conduction of current to the electrode gap is accomplished by a very high voltage - very high amperage switch operated either remotely and manually or automatically.

2 Claims, 5 Drawing Figures

Patented July 25, 1972

SHOCK PLASMA EARTH DRILL

SUMMARY OF THE INVENTION

My invention is a type of drill used for drilling deep holes in the earth such as might be used for water or oil. In this invention the energy required for breaking the earth and forcing it aside to provide a hole for a pipe is derived from the sudden and explosive release of a large quantity of electric current under high electric voltage by means of a physically strong, two element electrode connected to a condenser bank by means of electric cables and a series connected very high voltage electric switch. When the electrode is immersed in water and the switch completes the circuit for current to cross the gap between the elements of the electrode, the water is instantly ionized and converted to a highly conductive plasma which reacts as an electric resistance reacts for the production of heat under the influence of a great surge of voltage and amperage. Electric energy is thereby converted to heat energy in a very short time period producing a strong explosive effect. Means are employed to direct the shock wave downward and outward to force the earth away from the electrode producing a hole.

The inventive concept consists principally in the use of a series of explosions to form a deep hole in the earth when those explosions are produced by electricity and water at a spark gap of a strong two element electrode. The electrode thereby becomes the "drilling bit" and this electrode is continually lowered at the end of a long pipe into the successive cavities caused by each preceding explosion.

The relatively simple equipment and construction enable this drill to be employed in deprived areas where sufficient but deep subterranean water is available.

Various configurations and values are possible within the inventive concept and will be explained in greater detail and illustrated by the drawings which follow.

FIG. 1 of the drawings illustrates one embodiment of the inventive concept in longitudinal section.

FIG. 2 of the drawings is a transverse sectional view showing relative positions of electrode elements and insulating dielectric.

DETAILED DESCRIPTION OF EMBODIMENTS

Figure 1:
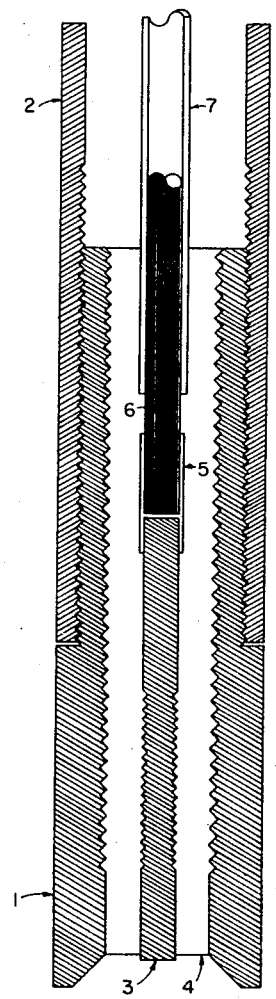
Figure 3:
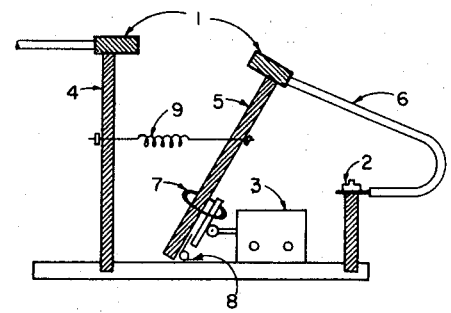
FIG. 3 depicts an high voltage-high amperage switch which can be remotely or automatically controlled by the current admitted to its solenoid.

Referring now to FIG. 1 and the embodiment of the basic inventive concept 1 of this figure is the outer conductive element of the two element electrode. It is the principal structural strength member of the "drill bit". It is physically supported by and electrically connected to pipe 2 which extends up to the surface of the earth. Regarding 1 there is a slightly conical hone at its lower end extending downward and outward to cause downward thrust to the energy released. Of this same figure 3 is the second electrode at the center of the bit and it is electrically connected to cable 6 by connecting sleeve 5. Of the same figure 1 the number 4 is a polyester plastic embedded with figerglass. Its purpose is to electrically insulate electrode 3 from electrode 1 and to rigidly support electrode 3 which it does by means of its strength and by the use of threads. It must be able to sustain shock as well as the high voltage without breaking down either electrically or physically. Strong ceramic may also be used. Number 7 is high voltage insulating sleeve embedded in plastic insulation 4 and encircling electric cable 6 the entire length of the cable up to the surface and to the high voltage switch.

Figure 2:
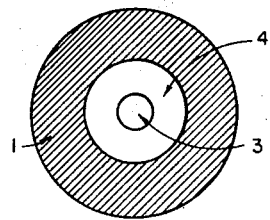

Referring to FIG. 2 of the drawings and the transverse sectional view showing relative positions of 1, 3 and 4 is helpful for the purpose of explaining that the separation of 1 from 3 is important with respect to the voltage and capacitance used in the condenser bank. When a voltage of 6,000 volts was used with a condenser bank of 400 microfarads a strong effective shock was produced in water when the separation radially between the outer surface of electrode 3 and the inner surface of electrode 1 was three-quarters of an inch and the diameter of inner electrode 3 was one-fourth of an inch.

FIG. 3 depicts an high-voltage, high-amperage switch which can be remotely or automatically controlled by the current admitted to a solenoid which controls it. Of this FIG. 11 pictures the contact points of the switch. These are made of heavy pieces of copper or tungsten. Number 14 is a stationary support for a contact point made of strong electrically insulating plastic. Number 15 is a moveable lever arm of the same material as 14. Number 15 is connected to hinge 18 by means of which it can rock back and forth with a long swing of several inches to move contact points in and out of contact with each other.

Number 12 of FIG. 3 is an insulating terminal with connector to enable flexible cable 16 to be connected to contact point 11 as well as to facilitate connecting the same cable 16 to remainder of circuitry. 13 is a solenoid with moveable arm extending on the left. When terminals at the base of 13 are energized magnetic windings pull this arm and lever to the right. The function of pungee cord 17 which is a heavy band of rubber is to absorb shock from the fast acting solenoid and prevent sudden strain on lever arm 15. The purpose of spring 19 is to close the contact points and to keep them closed when the current is off thus preventing the accumulation of an inadvertent charge on the condenser bank.

Figure 4:
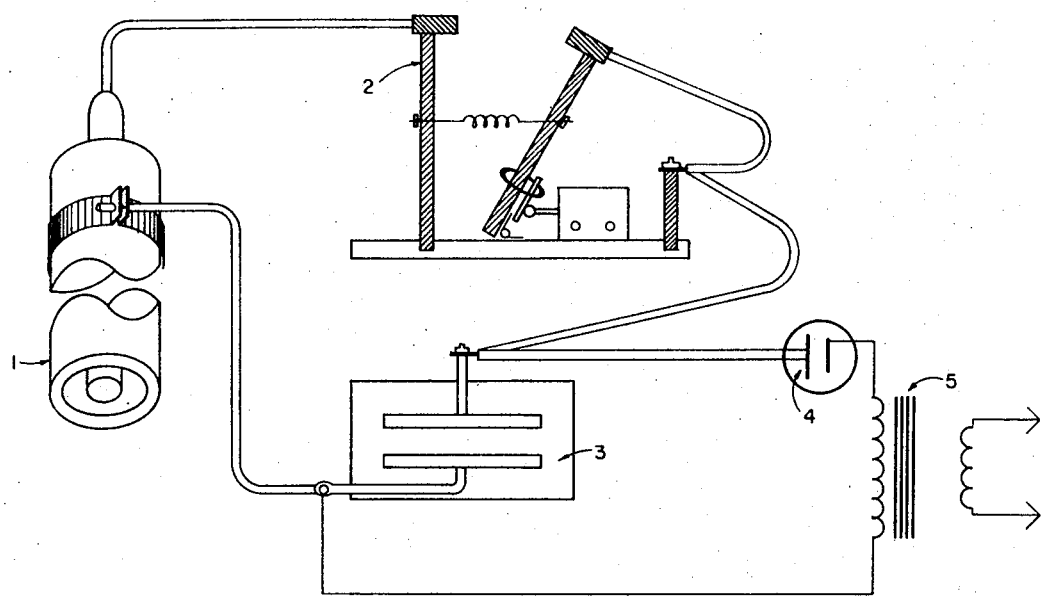
FIG. 4 is the basic composite schematic picture of the most basic drill elements.

In FIG. 4, the composite schematic picture, the number 21 represents the pipe and drilling head with connecting cables. Switch 22 connects condenser bank 23 to electrode and pipe assembly. The high voltage rectifier 24 in conjunction with high voltage transformer 25 capable of 6,000 volts or more supplies current to the condenser bank. The internal resistance of the secondary should be matched to the current carrying abilities of 24 or additional resistance may be added in series between 24 and 25 to protect components from overload. Number 26 is a connecting strap connecting current from capacitor bank to pipe and electrode outer element. When condenser 3 reaches desired voltage, switch 22 is closed by opening the circuit of the solenoid which holds the switch open. When the switch is closed and the initial surge of voltage from condenser bank 23 reaches the electrodes in the water at the base of 21 the resistance of the water is greatly lowered as the water is converted to the plasma state. Since all contacts cables and connectors are very heavy and the resistance of the circuit is very low the time constant for the discharge of the condenser bank is in the order of a few hundred microseconds. This rapid release of electric energy across the resistance of the water plasma produces very great heat in a short enough period of time to produce an explosive effect the outrush of which impacts and thrusts aside the earth ahead of the electrode.

Figure 5:
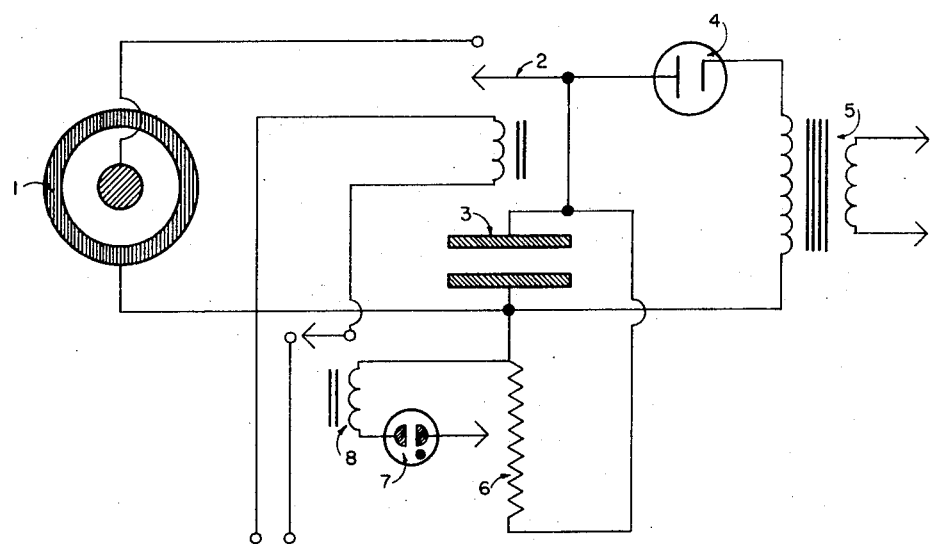
FIG. 5 shows the circuitry of the basic elements plus the automatic switching mechanism.

In FIG. 5 No. 21 is the electrode and 22 is the switch. 23 is the condenser bank. No. 24 is the rectifier and 25 the transformer. The automatic elements of the circuit are added here to make the operation easier. Number 29 is a voltage divider across the condenser bank. The function of this variable divider is to sample a predetermined fraction of the total voltage desired across the condenser bank and to use this as index voltage for energizing relay 28 through ionizing tube 27 which gives positive action to relay 28. When relay 28 is energized contacts open deenergizing electric switch 22 which causes it to engage its contact points thereby discharging condenser 23 through electrode number 21. By setting sliding contact of voltage divider 29 closer to condenser banks lower plate more voltage must charge across condenser plates before there will be sufficient voltage to ionize gas tube 27 and energize relay 28 causing its points to open and the points of 22 to close. Thereby if the condenser bank has sufficiently high voltage capabilities a setting of six thousand volts can be used for soft earth and higher voltages of 30 KV and more may be used for harder soil or rocky areas.

What I claim is:

1. A device for producing deep holes in the earth by the repeated discharges of a condenser bank of large electric capacity of 400 microfarads or more and high electric voltage of 6,000 volts or more which condenser bank is discharged into water by means of a two element electrode fastened at the end of a pipe which electrode has a center element insulated from the outer cylindrical element which encircles it by means of strong electrically insulating material which same center element is in the form of a steel rod and is electrically connected to a heavy electric cable which cable being highly insulated with a plastic covering is connected to a switch in series with the condenser bank and the electrode, said switch being remotely operated by means of a solenoid completes the circuit between the condenser bank and the electrode the current passing through water in moving from one element of the electrode to the other and returning to the condenser bank thereupon producing a very rapid release of electric energy across the electric resistance of the water which is converted to a plasma liberating a great quantity of heat in a short period of time as to produce an explosive impact breaking the earth or rock, ejecting it downward and outward and away from the electrode in increments as the electrode is lowered into the earth.

2. a device for producing deep holes in the earth by the repeated discharges of a condenser bank of large electric capacity of 400 microfarads or more and high electric voltage of 6,000 volts or more which condenser bank is discharged into water by means of a two element electrode electrically and physically fastened at the end of a pipe which electrode has a center element insulated from the outer cylindrical element which encircles it by means of strong electrically insulating material which same center element is in the form of a steel rod and is electrically connected to a heavy electric cable which cable being highly insulated with a plastic covering extends through the center of the pipe and is connected to a switch in series with the condenser bank and the electrode, said switch being remotely and automatically operated by means of a solenoid in such a manner that when the solenoid is engaged or energized the contact points of the condenser discharge switch are open and the electric circuit which carries the current to energize this solenoid flows in series with other relay points which are in contact when the coil of the relay is not energized but which does become energized when voltage taken from a variable voltage divider connected across the condenser bank causes the voltage at a point on the voltage divider to become high enough to ionize gas in an ionizing tube placed in series with this relay coil whereby depending upon the setting of the voltage divider and the ionizing voltage of the tube as the condenser reaches a predetermined potential it is caused to discharge because the fraction of the voltage from the divider representative of the voltage across the condenser and passing through the ionizing tube energizes the relay whose points then open breaking the circuit of the solenoid which allows the condenser discharge points to contact and discharge the condenser bank through the electrode the current passing through the water in moving from one element of the electrode to the other and returning to the condenser bank thereupon producing a very rapid release of electric energy across the electric resistance of the water which is converted to a plasma liberating a great quantity of heat in a very short period of time so as to produce an explosive effect impacts the earth and moves it away from the electrode in small increments as the electrode is lowered into the earth.

* * * * *